United States Patent [19]
Hamel et al.

[11] Patent Number: 5,712,717
[45] Date of Patent: Jan. 27, 1998

[54] HIGH ISOLATION, OPTICAL ADD-DROP MULTIPLEXER

[75] Inventors: André Hamel, Lannion; Daniel Laville, Perrus Guire; Eric Delevaque, Ploumillian, all of France

[73] Assignee: France Telecom, Paris, France

[21] Appl. No.: 609,519

[22] Filed: Mar. 1, 1996

[30] Foreign Application Priority Data

Mar. 3, 1995 [FR] France .................. 95 02487

[51] Int. Cl.$^6$ .................................. H04J 14/02
[52] U.S. Cl. .......................... 359/130; 359/127
[58] Field of Search .......................... 359/127, 130, 359/131; 385/37, 47

[56] References Cited

U.S. PATENT DOCUMENTS

| | | | |
|---|---|---|---|
| 4,693,544 | 9/1987 | Yamasaki et al. | 359/127 |
| 4,973,124 | 11/1990 | Kaede | 359/130 |
| 5,283,686 | 2/1994 | Huber | 359/337 |
| 5,457,758 | 10/1995 | Snitzer | 385/30 |

FOREIGN PATENT DOCUMENTS

| | | |
|---|---|---|
| 2537733 | 6/1984 | France . |
| 2565442 | 12/1985 | France . |

OTHER PUBLICATIONS jones et al, "Optical Wavelength Add–Drop Multiplexer in Instaololed Submarine WDM Network", Electronic Letters, vol. 31 No. 24 pp. 2117–2118, Nov. 1995.

"Multiwavelength Survivable Ring Network Architectures", A.F. Elrefaie, Bellcore ICC 93.

"A Fully Transparent Fiber Optical Ring Architecture . . . ", M.I. Irschid, M. Kavehrad; Journal of Lightwave Tech., vol. 10, No. 1, Jan. 1992.

J. E. Baran et al., "Multiwavelength Performance of an Apodized Acousto–Optic Switch", OFC '94, TuM5.

A. F. Elrefaie et al., "Fiber Amplifiers in Closed Ring WDM Networks", Electron. Lett., vol. 28, pp. 2340–2341, 1992.

Y. Tachiwaka et al., "Arrayed–Waveguide Grating Add–Drop Multiplexer . . . ", Electronics Letters, vol. 29, No. 24, pp. 2133–2134.

A. Hamel, V. Tholey, M. J. Chawki, "WDM–SDH Networks: An Alternative to SDH rings", EFOC & N94; pp. 98–101.

F. Bilodeau et al., "Compact All Fiber Narrowband Transmission Filter using Bragg Gratings", ECOC 93, pp. 29–32.

S. Legoubin et al., "Inscription De Reseaux Photorefractifs Dans Des Fibres Dopees . . . ", Journees Optique Guidee 1993, pp. 175–176.

U.S. Ser. No. 08/665,798, filed Jun. 17, 1996, "A Reconfigurable Device for Insertion–Extraction of Wavelengths", Andre Hamel et al.

U.S. Ser. No. 08/604,417, Filed Feb. 21, 1996, Entitled: Optical Add–Drop Multiplexer using Optical Circulators and Photo–Induced Bragg Gratings, Chawki et al.

Microwave and Optical Technology Letters, vol. 7, No. 11, 5 Aug. 1994, pp. 499–500, J. Capmany et al., "A Novel Highly Selective and Tunable Optical Bandpass Filter using a Fiber Grating and a Fiber Fabry–Perot".

European Conference on Optical Communication (ECOC 93), vol. 3, 12 Sep. 1993, Montreux, Switzerland, pp. 29–32, F. Bilodeau et al., "Compact All–Fiber Narrowband Transmission Filter using Bragg Gratings".

*Primary Examiner*—Leslie Pascal
*Attorney, Agent, or Firm*—Pearne, Gordon, McCoy & Granger LLP

[57] ABSTRACT

According to the invention, a first band-pass multidielectric filter (F1) receives optical signals, transmits at least one of them and reflects the untransmitted signals. An adding means (F2) inserts among them at least one other optical signal. A photoinduced Bragg grating filter (R) receives the signals reflected by the first filter and transmits them to the adding means and reflects any optical signal of the same wavelength as the signal transmitted by the first filter and which is liable to exist among the signals reflected by it. Application to optical telecommunications.

7 Claims, 1 Drawing Sheet

HIGH ISOLATION, OPTICAL ADD-DROP MULTIPLEXER

TECHNICAL FIELD

The present invention relates to an optical add-drop multiplexer. It more particularly applies to the field of optical telecommunications.

PRIOR ART

With the introduction of the synchronous digital hierarchy (SDH), ring transmission architectures have an economic interest and a better reliability. It has been proposed to apply optical multiplexing procedures to ring transmission architectures.

Such applications are known from documents (1) and (2) which, like the other documents referred to hereinafter, are mentioned at the end of the description.

For example, unidirectional transmission loops are known, in which several stations are positioned successively, each having an optical add-drop multiplexer.

The informations intended for a given station are transported by an optical signal of given wavelength $\lambda$ and reach the optical multiplexer of said station. Thus, an optical add-drop multiplexer is a key component of the aforementioned applications.

If the signal of wavelength $\lambda$ is almost completely dropped by said multiplexer, i.e. if the residual signal of wavelength $\lambda$ in the loop, after dropping, is sufficiently weak, the return informations emitted by the multiplexer to the central station having the loop can use the same wavelength $\lambda$.

In such a case of wavelength reuse, a ring network having N stations, in which N is an integer exceeding 1, requires N wavelengths.

Several optical technologies are appropriate for producing an optical add-drop multiplexer. Reference should be made in this connection to document (3), in which the design of such a multiplexer is based on the use of an acoustooptically tunable, optical filter.

Such a component is at the stage of a laboratory product and is at present produced by integrated optics on lithium niobate. The adding losses of this component, independent of the polarization, are approximately 5 to 8 dB. The rejection level of the drop wavelength is approximately 15 to 18 dB.

Reference should also be made to document (4), which describes optical add-drop multiplexers produced from diffraction gratings connected back-to-back.

In such a case, all the wavelengths pass through two diffraction gratings connected back-to-back and the adding or insertion losses are approximately 6 dB.

It should be noted that there is a supplementary constraint, namely the need to have paired diffraction gratings so that their comb filtering functions are superimposed.

Document (15) discloses grating arrays, which are produced in integrated optical form on silicon or InP. They can be configured in such a way as to perform the add-drop function. The adding or insertion loss is then between 5 and 8 dB per channel.

Reference should also be made to document (6), which describes another solution for implementing an optical add-drop multiplexer. This other known multiplexer has two band-pass multidielectric filters.

For such filters, the representative curve of the band-pass transfer function in transmission has a half-width e.g. between 0.5 and 10 nm.

The transmission characteristic is used for dropping a given wavelength $\lambda$ whilst the reflection characteristic is used for directing all wavelengths in transit to the multiplexer output.

More specifically, one of the two filters receives signals of different wavelengths and reflects all said signals, except that having the wavelength $\lambda$ on which is centred said first filter.

The reflected signals reach the other filter and are also reflected by the latter to the multiplexer output. Said other filter also transmits to said output a signal to be added having the same wavelength $\lambda$ as the signal dropped by means of the first filter. The transmission level of such a band-pass multidirectional filter is approximately 90%.

If the absorption is negligible, approximately 10% of the power (relative to the wavelength $\lambda$) is reflected and superimposed on the other wavelengths present on the optical transmission line in which the multiplexer is located. Thus, the extraction of a signal of wavelength $\lambda$ with the first of the two filters is imperfect. Therefore, an unwanted signal of the same wavelength $\lambda$ is liable to be superimposed on the signal having said wavelength $\lambda$ and which is added as a result of the second filter.

DESCRIPTION OF THE INVENTION

The object of the invention is to obviate this disadvantage by means of a photoinduced Bragg grating filter. Such a Bragg grating filter has a band-pass transfer function in reflection.

A photoinduced Bragg grating filter is formed on an optical guide, e.g. an optical fibre or a planar guide (e.g. of silicon, InP or lithium niobate).

Reference should be made to documents (7) and (8) in connection with such photoinduced Bragg grating filters.

The present invention proposes adding between the two aforementioned multi-dielectric filters a photoinduced Bragg grating filter, which will block the wavelength $\lambda$ existing in reflection.

This gives a component (multidielectric filter associated with the photo-induced Bragg grating filter) having a high rejection level over a more extensive spectral range than that obtained with a multidielectric filter alone.

More specifically, the present invention relates to an optical add-drop multiplexer having:

a first band-pass, multidielectric filter for receiving a first group of optical signals and able to transmit at least one of these signals and reflect the signals of the group which are not transmitted and an optical adding means for receiving the thus reflected signals and at least one optical signal to be added among them and which is able to supply a second group of optical signals including the reflecting signals and the signal to be added, said multiplexer being characterized in that it also comprises a photo-induced Bragg grating filter, which is optically coupled, on one side, to the first multidielectric filter for receiving the signals reflected by said first filter and, on the other side, to the adding means and able to transmit said reflected signals to said adding means and reflect to the first filter one or more optical signals, which have the same wavelength or wavelengths as the signal or signals transmitted by said first filter and which are liable to exist among the signals reflected by said first filter.

According to a first special embodiment of the optical multiplexer according to the invention, the optical adding means comprises of a 2 to 1 optical coupler, having a first input receiving the signals transmitted by the photoinduced Bragg grating filter, a second input receiving the optical signal to be added and an output supplying the second group of signals.

According to a second special embodiment, the optical adding means comprises a second band-pass, multidielectric filter, which receives the signals transmitted by the photo-induced Bragg grating filter and the optical signal to be added and which is able to transmit, to the output of said second filter, said optical signal to be added and also reflected to said output the signals transmitted by said photoinduced Bragg grating filter.

In the case of the use of the second multidielectric filter, it is possible to use first and second multidielectric filters, which are centred on the same wavelength. Said first and second multidielectric filters can also have the same pass-band.

In the case of the use of the second multidielectric filter, the first and second multidielectric filters can be centred on different wavelengths.

According to a preferred embodiment making it possible to improve the selectivity of the multiplexer according to the invention with regards to dropping, said multiplexer also comprises at least one supplementary, photo-induced Bragg grating filter optically coupled to the first optical filter so as to transmit the signal or signals transmitted by the latter and able to reflect to said first filter one of said untransmitted signals of the group liable to exist among the signal or signals transmitted by said first filter.

BRIEF DESCRIPTION OF THE DRAWINGS

The present invention is described in greater detail hereinafter relative to non-limitative embodiments and with reference to the attached drawings, wherein show.

DETAILED DESCRIPTION OF EMBODIMENTS

Figure 1:
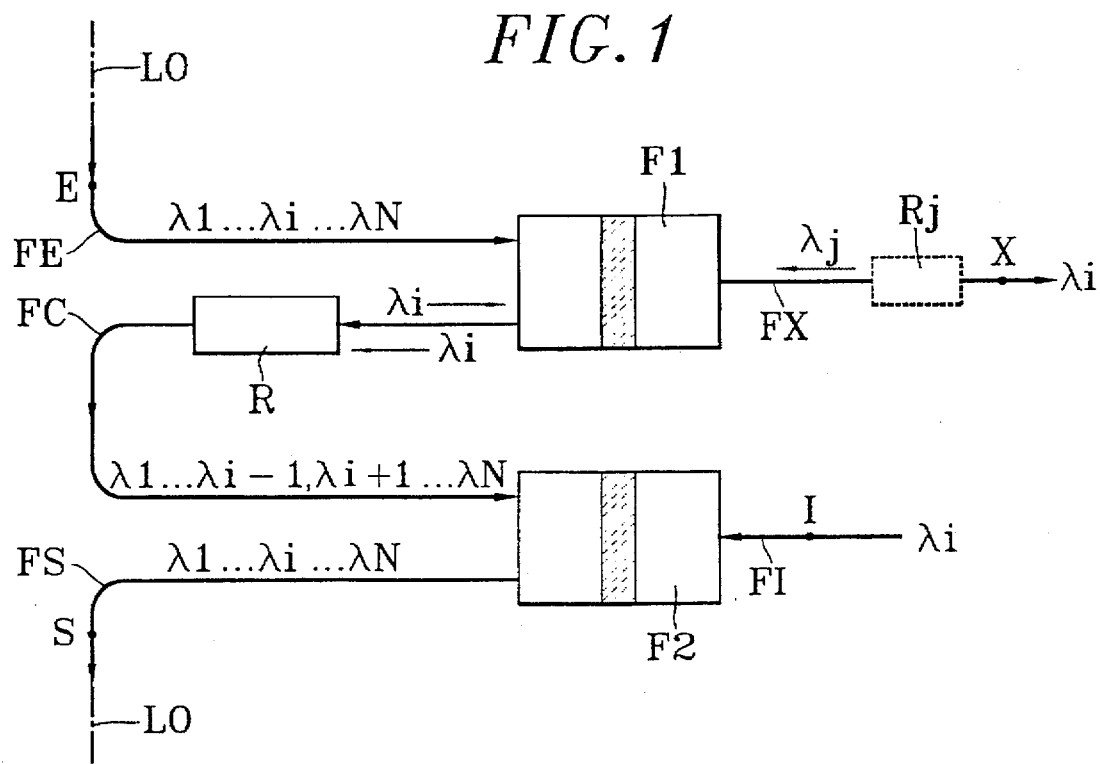
FIG. 1 A diagrammatic view of a first special embodiment of the optical add-drop multiplexer according to the invention.

The optical add-drop multiplexer according to the invention and which is diagrammatically shown in FIG. 1 is intended to add to a group of optical signals and drop from said group of signals, optical signals having given wavelengths.

The wavelengths of the considered optical signals belong to a group of wavelengths $\lambda 1 \ldots \lambda i \ldots \lambda N$, in which N is an integer higher than 1.

The aim is e.g. to add and/or drop a signal with a wavelength chosen from within the group of wavelengths $\lambda 1 \ldots \lambda N$ and is e.g. $\lambda i$, in which $1<i<N$.

The multiplexer shown in FIG. 1 is added in an optical transmission line LO e.g. forming an optical loop containing other, not shown optical multiplexers, identical to that of FIG. 1 and positioned upstream and downstream thereof on the optical line LO through which passes the signals of wavelengths $\lambda 1 \ldots \lambda i \ldots \lambda N$.

The optical add-drop multiplexer according to the invention and which is diagrammatically shown in FIG. 1, comprises a first, band-pass, multidielectric filter F1 and a second, band-pass, multidielectric filter F2.

The first filter F1 is optically coupled by an optical fibre FE to the optical line LO to receive the signals $\lambda 1 \ldots \lambda N$, which travel within said line. The fibre FE is connected to the line LO at a point E constituting the multiplexer input. The filter F1 is centred on the wavelength $\lambda i$, which it is wished to drop and transmits the incident signal of wavelength $\lambda i$ (signal to be dropped).

At the output of the filter F1, the thus transmitted signal passes into an optical fibre FX, which is optically coupled at a point X (multiplexer drop output) to not shown, processing means for the dropped signal.

The other incident signals of wavelengths $\lambda 1 \ldots \lambda i-1$, $\lambda i+1 \ldots \lambda N$ are reflected by the filter F1 and supplied, via an optical fibre FC, to the second filter F2, which has the same spectral characteristics as the filter F1.

This means that the filter F2 is centred on the same wavelength i as the filter F1 and has the same pass-band as the latter. Thus, the filter F2 reflects the incident signals of wavelengths $\lambda 1 \ldots \lambda i-1, \lambda i+1 \ldots \lambda N$.

These signals reflected by the filter F2 are transmitted to the optical transmission line LO by means of an optical fibre FS. The fibre FS is connected to the optical line LO at a point S (multiplexer output).

The filter F2 is connected, on one side, to the fibres FC and FS and, on the other side, to an optical fibre FI.

In said fibre FI propagates an optical signal of wavelength i, which it is wished to add among the other signals. This signal of wavelength $\lambda i$ comes from not shown generating means connected to the fibre FI at a point I (multiplexer adding input).

The signal to be inserted of wavelength $\lambda i$ is transmitted by the filter F2 and is added among the other signals in the fibre FS and passes with the latter into the line LO.

In a purely indicative and in no way limitative manner, the fibres FE, FX, FC, FI and FS have a diameter 10 μm core and a diameter 125 μm optical sheath.

Such an add-drop structure using the filters F1 and F2 is already known and has disadvantages, in the manner described hereinbefore.

For example, use is made of multidielectric filters F1 and F2, which in both cases are centred on a wavelength $\lambda i$ of 1540 nm and which are usable in transmission in the range 1540±2 nm (with a width of 4 nm).

Moreover, said filters are such that for a displacement of ±2 nm from 1540 nm, the adding or insertion losses increase by 0.5 dB, but the rejection ratio deteriorates by 4 dB and drops to a value of 11 dB, which is inadequate for the reuse of the wavelength $\lambda i$ (1540 nm) in an optical fibre transmission.

This deterioration imposes constructional restraints of greater severity for the multidielectric filter F1 (with a view to obtaining a higher transmission coefficient) and constraints regarding the centring of the transmission wavelengths of the light sources associated with the optical line LO.

In order to obviate these disadvantages, the multiplexer of FIG. 1 also comprises, according to the invention, a photo-induced Bragg grating filter R for increasing the rejection ratio value. This filter R is formed on the fibre FC.

The filter R transmits to the filter F2 the signals of wavelengths $1 \ldots \lambda i-1, \lambda i+1 \ldots \lambda N$ from the filter F1, but reflects any optical signal of wavelength $\lambda i$ existing among the signals from the filter F1.

The filter R is centred on the same wavelength as the filter F1, namely $\lambda i$, and has the same passband (in reflection) as the filter F1.

It is pointed out that the Bragg grating of the filter R is induced in the core of the optical fibre FC, which can be a standard G652 telecommunications fibre.

For example, prior to the marking of the grating, said fibre is placed in a molecular hydrogen atmosphere at a pressure of approximately $200 \times 10^5$ Pa for 15 days in order to increase its photosensitivity.

The marking method used is of the transverse holographic type and uses an argon laser, whose frequency is doubled in its cavity and which emits continuous ultraviolet radiation of wavelength 244 nm.

It is e.g. possible to produce with said method photoinduced Bragg grating filters centred on 1540 nm and having a reflection peak, whose half-width can be between approximately 0.1 nm and approximately 5 nm with a reflectivity above 99%.

The addition of a photoinduced Bragg grating filter R centred on 1540 nm and having a reflection peak with a half-width of 4 nm makes it possible to increase the rejection ratio by 20 dB on the range 1540±2 nm.

The rejection ratio of the assembly constituted by the filter F1 and the filter R is then 30 dB in the useful spectral range 1540±2 nm (pass band at 0.5 dB in transmission).

Such a value of 30 dB permits the reuse of wavelengths in the passband in transmission of a multidielectric filter in an optical fibre network of the "point-to-point" or "ring" transmission type, with few constraints regarding the spectral allocation of the light source with the network.

In a not shown, constructional variant, the filter F1 and/or filter F2 have sufficiently wide passbands to permit the adding and/or dropping of more than one optical signal.

In this case, with regards to the filter F1, with it is associated an adapted, photoinduced Bragg grating filter R, permitting the transmission of signals which are not dropped and to reflect to the filter F1 signals having the wavelengths of the signals which are dropped.

This adapted filter is formed from elementary photoinduced Bragg grating filters in series and respectively centred on the wavelengths to be reflected to the filter F1.

It would also be possible to implement a multiplexer according to the invention in which the filters F1 and F2 were again centred on the same wavelength, but having different passbands.

In another, not shown variant, the filters F1 and F2 are centred on different wavelengths in order to be able to drop from the optical line a signal having the wavelength on which the filter F1 is centred and add to said optical line a signal having the wavelength on which the flter F2 is centred.

Figure 2:
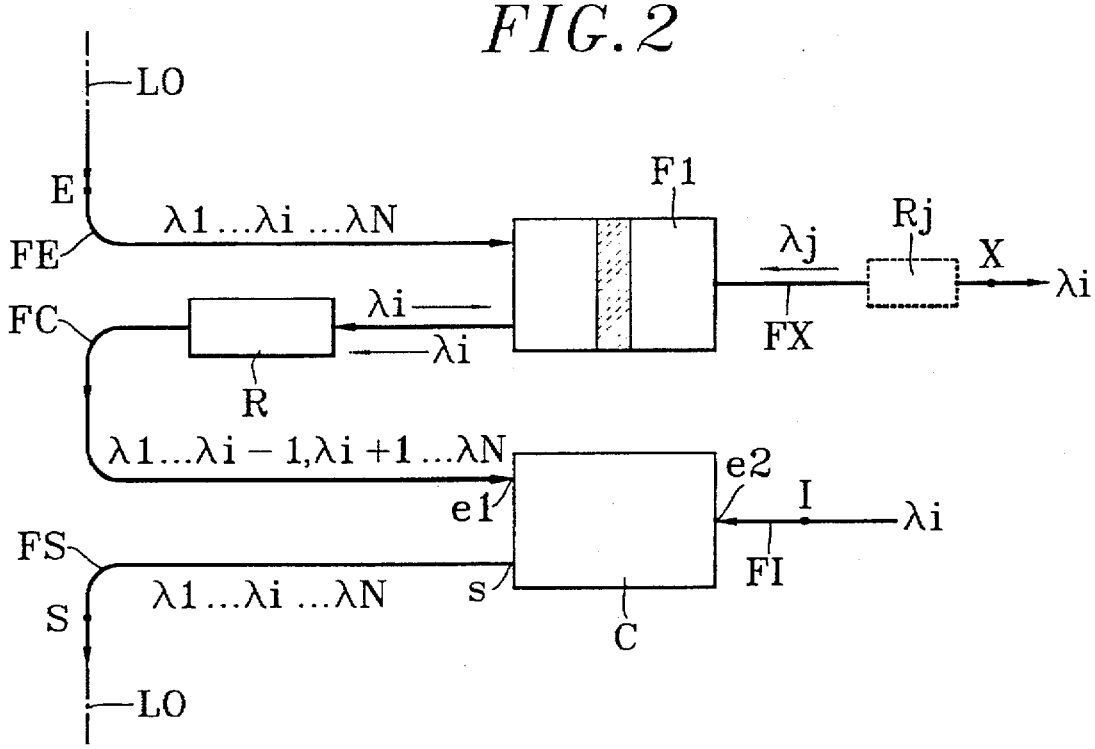
FIG. 2 A diagrammatic view of a second special embodiment of the multiplexer.

Another multiplexer according to the invention is diagrammatically shown in FIG. 2 and it differs from that of FIG. 1 by the fact that the filter F2 is replaced by a 2 to 1 optical coupler. This optical coupler has two inputs e1 and e2 and one output s.

The input e1 is coupled to the fibre FC in order to receive signals of wavelengths $\lambda 1 \ldots \lambda i-1, \lambda i+1, \ldots \lambda N$, which are transmitted by the filter R. The input e2 is coupled to the fibre FI to receive the signal to be added of wavelength $\lambda i$.

The output s is coupled to the fibre FS to transmit thereto the signals of wavelengths $\lambda 1 \ldots \lambda i-1, \lambda i+1 \ldots \lambda N$ and the added signal of wavelength $\lambda i$, which has been mixed therewith as a result of the coupler.

In order to improve the selectivity of the multiplexers of FIGS. 1 and 2, it is possible to add at least one photoinduced Bragg grating filter Rj on the fibre FX, said filter Rj being centred on a wavelength $\lambda j$ belonging to the wavelength group $\lambda 1 \ldots \lambda N$, with $\lambda j \neq \lambda i$. This makes it possible to reduce the level of the signal of wavelength $\lambda j$ (liable to exist in spite of the filter F1) at the output X, where is installed an optical receiver for the signal of wavelength i.

Such a filter Rj is of particular interest if the signal of wavelength $\lambda j$ is at a high level (e.g. 0 dBm) at point E of the input fibre FE, whereas the other signals are at a lower level (e.g. −30 dBm). The filter F1 will bring the level of the signal of wavelength $\lambda j$ to approxiamtely −30 dBm at point X, as a result of its isolation characteristic, which essentially permits the passage of the signal of wavelength $\lambda i$. However, in order to ensure a good reception of the signal of wavelength $\lambda i$ after point X, it is necessary for the level of the signal of wavelength $\lambda j$ to be approximately 25 dB below the level of the useful signal of wavelength $\lambda i$. This supplementary attenuation is obtained by means of a photoinduced Bragg grating filter centred on the wavelength j and which brings about an attenuation of 25 dB.

In place of the filter Rj, it is possible to add to the fibre FX a plurality of series-arranged, photoinduced Bragg grating filters respectively centred on wavelengths different from one another and from that or those which it is wished to transmit through the filter F1.

The following documents have been referred to in the present description:

(1) "Multiwavelength survivable ring network architectures", A. F. ELREFAIE; Bellcore ICC 93

(2) "A fully transparent fiber optical ring architecture for WDM Networks" M. I. IRSHID, M. KAVEHRAD; Journal of Lightwave Technology, vol. 10, No. 1, January 92

(3) J. E. Baran et al., "Multiwavelength performance of an apodized acousto-optic switch", OF '94, TuM5

(4) A. F. Elrefaie et al., "Fibre amplifiers in closed ring WDM networks", Electron. Lett., vol. 28, pp 2340–2341, 1992

(5) Y. Tachiwaka et al., "Arrayed-waveguide grating add-drop multiplexer with loop-back optical paths", Electronics Letters, vol. 29, No. 24, pp 2133–2134

(6) A. Hamel, V. Tholey, M. J. Chawki, "WDM-SDH Networks: an alternative to SDH rings", EFOG & N94; pp 98–101

(7) F. Bilodeau et al., "Compact all fiber narrowband transmission filter using Bragg gratings", ECOC 93, pp 29–32

(8) S. LEGOUBIN, M. DOUAY, P. BERNAGE, P. NIAY, J. F. BAYON, T. GEORGES; Inscription de réseaux photoréfractifs dans des fibres dopées a l'oxyde de germanium, Journées optique guidée 1993, pp 175–176.

We claim:

1. Optical add-drop multiplexer having:
 a first band-pass, multidielectric filter (F1) for receiving a first group of optical signals and able to transmit at least one of these signals and reflect the signals of the group which are not transmitted and
 an optical adding means (F2, C) for receiving the thus reflected signals and at least one optical signal to be added among them and which is able to supply a second group of optical signals including the reflecting signals and the signal to be added,
 said multiplexer being characterized in that it also comprises a photo-induced Bragg grating filter (R), which is optically coupled on one side, to the first multidielectric filter (F1) for receiving the signals reflected by said first filter and, on the other side, to the adding means (F2, C) and able to transmit said reflecting signals to said adding means and reflect to the first filter one or more optical signals, which have the same wavelength or wavelengths as the signal or signals transmitted by said first filter and which are liable to exist among the signals reflected by said first filter.

2. Multiplexer according to claim 1, characterized in that the optical adding means comprises a 2 to 1 optical coupler (C) having a first input receiving the signals transmitted by the photoinduced Bragg grating filter (R) and a second input receiving the optical signal to be added, as well as an output supplying the second group of signals.

3. Multiplexer according to claim 1, characterized in that the optical adding means comprises a second, band-pass, multidielectric filter (F2) receiving the signals transmitted by the photoinduced Bragg grating filter (R) and the optical filter to be added and able to transmit, to the output of said second filter, said optical signal to be added and also to reflect, to said output, the signals transmitted by the photoinduced Bragg grating filter.

4. Multiplexer according to claim 3, characterized in that the first multidielectric filter (F1) and the second multidielectric filter (F2) are centred on the same wavelength.

5. Multiplexer according to claim 4, characterized in that the first multidielectric filter (F1) and the second multidielectric filter (F2) also have the same passband.

6. Multiplexer according to claim 3, characterized in that the first multidielectric filter (F1) and the second multidielectric filter (F2) are centred on different wavelengths.

7. Multiplexer according to claim 1, characterized in that it also comprises at least one supplementary, photoinduced Bragg grating filter (Rj) optically coupled to the first optical filter (F1) so as to transmit the signal or signals transmitted by the latter and able to reflect, to said first filter, one of the untransmitted signals of the group liable to exist among the signal or signals transmitted by said first filter.

* * * * *

UNITED STATES PATENT AND TRADEMARK OFFICE
CERTIFICATE OF CORRECTION

PATENT NO. : 5,712,717
DATED : January 27, 1998
INVENTOR(S) : Hamel et al.

It is certified that error appears in the above-indentified patent and that said Letters Patent is hereby corrected as shown below:

On the title page:

In the Inventors section, delete "Perrus" and insert --Perros--.

Column 2, line 54, delete "reflecting" and insert --reflected--.

Column 3, line 55, delete "1<i<N" and insert --$1 \leq i \leq N$--.

Column 6, line 3, delete "$\lambda j \neq \lambda i$" and insert --$\lambda j \neq \lambda i$"--.

Column 6, line 43, delete "EFOG" and insert --EFOC--.

Column 6, line 62, delete "reflecting" and insert --reflected--.

Column 6, line 66, delete "coupled" and insert --coupled,--.

Column 7, line 2, delete "reflecting" and insert --reflected--.

UNITED STATES PATENT AND TRADEMARK OFFICE
CERTIFICATE OF CORRECTION

PATENT NO. : 5,712,717
DATED : January 27, 1998
INVENTOR(S) : Hamel et al.

It is certified that error appears in the above-identified patent and that said Letters Patent is hereby corrected as shown below:

Column 7, line 18, delete "filter" and insert --signal--.

Signed and Sealed this

Nineteenth Day of May, 1998

Attest:

BRUCE LEHMAN

*Attesting Officer*     *Commissioner of Patents and Trademarks*